(12) United States Patent
Sistonen et al.

(10) Patent No.: US 11,665,553 B2
(45) Date of Patent: May 30, 2023

(54) ADAPTIVE ANTENNA ARRANGEMENTS FOR CELLULAR COMMUNICATION SYSTEM

(71) Applicant: Nokia Technologies Oy, Espoo (FI)

(72) Inventors: Paavo Sakari Sistonen, Espoo (FI); Mikko Juhani Junttila, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/913,485

(22) Filed: Jun. 26, 2020

(65) Prior Publication Data

US 2020/0413269 A1 Dec. 31, 2020

(30) Foreign Application Priority Data

Jun. 27, 2019 (EP) .................................... 19182882

(51) Int. Cl.
*H04W 16/28* (2009.01)
*H04B 7/0413* (2017.01)
(Continued)

(52) U.S. Cl.
CPC .......... *H04W 16/28* (2013.01); *H04B 7/0413* (2013.01); *H04W 24/02* (2013.01);
(Continued)

(58) Field of Classification Search
CPC ................ H04B 7/0413; H04W 88/08; H04W 84/045; H04W 48/16; H04W 24/02; H04W 16/28
See application file for complete search history.

(56) References Cited

U.S. PATENT DOCUMENTS

| | | | |
|---|---|---|---|
| 7,831,280 | B2 | 11/2010 | Goldberg |
| 8,396,368 | B2 | 3/2013 | Tarlazzi et al. |

(Continued)

FOREIGN PATENT DOCUMENTS

| | | |
|---|---|---|
| GB | 2361385 A | 10/2001 |
| WO | 2018171426 A1 | 9/2018 |

OTHER PUBLICATIONS

Communication pursuant to Article 94(3) EPC for corresponding European application No. 19182882.1; dated Jul. 22, 2021 (5 pages).

(Continued)

*Primary Examiner* — Wayne H Cai
(74) *Attorney, Agent, or Firm* — Mendelsohn Dunleavy, P.C.; Steve Mendelsohn

(57) ABSTRACT

A solution for controlling active antenna modules in a cellular communication system. According to an aspect, a method includes causing, at a first time interval, a first antenna module and a second antenna module to respectively provide overlapping coverage areas inside a service area of an access node of a cellular communication system, wherein the first antenna module and the second antenna module are antenna modules of the access node and each of the first antenna module and the second antenna module provides respective coverage in the service area within the overlapping coverage area, the respective coverages being independent of one another; and causing, at a second time interval, the first antenna module and the second antenna module to respectively provide non-overlapping coverage areas.

20 Claims, 7 Drawing Sheets

(51) Int. Cl.
*H04W 24/02* (2009.01)
*H04W 48/16* (2009.01)
*H04W 88/08* (2009.01)
*H04W 84/04* (2009.01)

(52) U.S. Cl.
CPC .......... *H04W 48/16* (2013.01); *H04W 88/08* (2013.01); *H04W 84/045* (2013.01)

(56) References Cited

U.S. PATENT DOCUMENTS

| | | | | |
|---|---|---|---|---|
| 2016/0080061 A1* | 3/2016 | Yang | .................. | H04W 24/02 |
| | | | | 375/267 |
| 2016/0127101 A1* | 5/2016 | Hanson | ................ | H04W 16/20 |
| | | | | 375/267 |
| 2016/0249230 A1* | 8/2016 | Akbar | .................. | H04W 24/02 |
| 2017/0215117 A1* | 7/2017 | Kwon | .................. | H04W 36/32 |
| 2017/0238271 A1* | 8/2017 | Viorel | ................ | H04B 7/0617 |
| | | | | 370/350 |
| 2018/0006705 A1* | 1/2018 | Cariou | ................ | H04B 7/0695 |
| 2018/0098330 A1 | 4/2018 | Nguyen et al. | | |
| 2018/0199328 A1 | 7/2018 | Sang et al. | | |
| 2018/0351605 A1 | 12/2018 | Liang et al. | | |
| 2020/0259896 A1* | 8/2020 | Sachs | ................ | G07C 9/00174 |
| 2020/0367110 A1* | 11/2020 | Sun | ........................ | H04L 43/16 |
| 2021/0175945 A1* | 6/2021 | Chen | .................... | H04B 7/0617 |

OTHER PUBLICATIONS

Lombardo, P., et al. "Pattern Control for Adaptive Antenna Processing with Overlapped Sub-Arrays." 2003 Proceedings of the International Conference on Radar, Sep. 3-5, 2003, 6 pages.

Extended European Search Report for corresponding European application No. 19182882.1; dated Dec. 17, 2019 (9 pages).

Communication pursuant to Article 94(3) EPC for corresponding European application No. 19182882.1; dated Feb. 21, 2023 (7 pages).

* cited by examiner

ADAPTIVE ANTENNA ARRANGEMENTS FOR CELLULAR COMMUNICATION SYSTEM

FIELD

Various embodiments described herein relate to the field of wireless communications and, particularly, to adaptive antenna arrangements.

BACKGROUND

Conventional cellular communication systems are based on access nodes that provide one or more cells within their respective service areas. An access node may provide multiple cells by using adaptive antennas and spatial directivity such that the cells are formed by radio beams directed to different directions. The cells are formed to distinct geographical areas, and radio signals associated with neighboring cells are typically considered as interfering with one another. Some overlapping between the radio signals may be needed to provide seamless handover of a terminal device from one cell to another.

From another perspective, micro cells, pico cells, or femto cells are established within a macro cell. In such a case, different access nodes provide overlapping coverage areas, and again the signals from the different access nodes or cells are considered to interfere with one another.

BRIEF DESCRIPTION

Some aspects of the disclosure are defined by the independent claims.

Some embodiments of the disclosure are defined in the dependent claims.

According to an aspect, there is provided an apparatus comprising means for performing: causing, at a first time interval, a first antenna module and a second antenna module to respectively provide overlapping coverage areas inside a service area of an access node of a cellular communication system, wherein the first antenna module and the second antenna module are antenna modules of the access node and each of the first antenna module and the second antenna module provides respective coverages in the service area within the overlapping coverage area, said respective coverages being independent of one another; and causing, at a second time interval, the first antenna module and the second antenna module to respectively provide non-overlapping coverage areas.

In an embodiment, the first antenna module is located at a different location within the service area than the second antenna module.

In an embodiment, the means are configured to cause, at the second time interval, the first antenna module to establish a first cell and the second antenna module to establish a second cell.

In an embodiment, the means are configured to cause, at the first time interval, the first antenna module to establish a first cell and the second antenna module to establish a second cell.

In an embodiment, each of the first antenna module and the second antenna module is configured to serve multiple terminal devices within its respective coverage area.

In an embodiment, the means are configured to control the first antenna module and the second antenna module on the basis measurement data received from at least one terminal device in the cell and/or at least one antenna module.

In an embodiment, the first antenna module is configured to cover substantially the whole service area, and wherein the means are configured to cause the second antenna module to direct a radio beam to the service area during the first time interval and to direct the radio beam away from the service area during the second time interval.

In an embodiment, the means are configured to perform said causing at the first time interval upon detecting at least one terminal device requesting for a connection specifying a reliability requirement above a determined threshold, and to perform said causing at the second time interval upon detecting termination of the connection.

In an embodiment, the means are further configured to select a multiple-input-multiple-output, MIMO, configuration for each of the first antenna module and the second antenna module separately for the first time interval and for the second time interval amongst multiple MIMO configurations supported by said each of the first antenna module and a second antenna module, wherein a MIMO configuration is defined in terms of a number of transmitting antennas and receiving antennas.

In an embodiment, the second antenna module is configured to provide connectivity within the overlapping coverage area during the first time interval in case the first antenna module malfunctions.

In an embodiment, the means are configured to change boundaries of the service area of the access node by switching control of at least one of the first antenna module and the second antenna module from the access node to another access node, or by switching control of a further antenna module from said another access node to the access node.

According to an aspect, there is provided an apparatus comprising means for: receiving, at a first time interval, a signal from a first antenna module of an access node and a second antenna module of said access node, wherein the first antenna unit and the second antenna unit respectively provide an overlapping coverage area inside a service area of the access node, and wherein each of the first antenna module and the second antenna module provides respective coverages in the service area within the overlapping coverage area, said respective coverages being independent from one another; and receiving, at a second time interval, a signal from only one of the first antenna unit and the second antenna unit that respectively provide non-overlapping coverage areas with respect to each other.

In an embodiment, the means are further configured to measure a signal received from at least one of the first antenna module and the second antenna module during at least one of the first time interval and the second time interval and to report corresponding measurement data to the access node.

In an embodiment, the above-described means comprises: at least one processor; and at least one memory including computer program code, the at least one memory and computer program code configured to, with the at least one processor, cause the performance of the apparatus.

According to an aspect, there is provided an apparatus comprising at least one processor and at least one memory including computer program code, wherein the at least one memory and computer program code configured to, with the at least one processor, cause the apparatus to: cause, at a first time interval, a first antenna module and a second antenna module to respectively provide overlapping coverage areas inside a service area of an access node of a cellular communication system, wherein the first antenna module and the second antenna module are antenna modules of the access node and each of the first antenna module and the second antenna module provides respective coverages in the service area within the overlapping coverage area, said respective coverages being independent of one another; and cause, at a second time interval, the first antenna module and the second antenna module to respectively provide non-overlapping coverage areas.

In an embodiment, the first antenna module is located at a different location within the service area than the second antenna module.

In an embodiment, the at least one memory and computer program code configured to, with the at least one processor, cause the apparatus to cause, at the second time interval, the first antenna module to establish a first cell and the second antenna module to establish a second cell.

In an embodiment, the at least one memory and computer program code configured to, with the at least one processor, cause the apparatus to cause, at the first time interval, the first antenna module to establish a first cell and the second antenna module to establish a second cell.

In an embodiment, each of the first antenna module and the second antenna module is configured to serve multiple terminal devices within its respective coverage area.

In an embodiment, the at least one memory and computer program code configured to, with the at least one processor, cause the apparatus to control the first antenna module and the second antenna module on the basis measurement data received from at least one terminal device in the cell and/or at least one antenna module.

In an embodiment, the first antenna module is configured to cover substantially the whole service area, and the at least one memory and computer program code configured to, with the at least one processor, cause the apparatus to cause the second antenna module to direct a radio beam to the service area during the first time interval and to direct the radio beam away from the service area during the second time interval.

In an embodiment, the at least one memory and computer program code configured to, with the at least one processor, cause the apparatus to perform said causing at the first time interval upon detecting at least one terminal device requesting for a connection specifying a reliability requirement above a determined threshold, and to perform said causing at the second time interval upon detecting termination of the connection.

In an embodiment, the at least one memory and computer program code configured to, with the at least one processor, cause the apparatus to select a multiple-input-multiple-output, MIMO, configuration for each of the first antenna module and the second antenna module separately for the first time interval and for the second time interval amongst multiple MIMO configurations supported by said each of the first antenna module and a second antenna module, wherein a MIMO configuration is defined in terms of a number of transmitting antennas and receiving antennas.

In an embodiment, the second antenna module is configured to provide connectivity within the overlapping coverage area during the first time interval in case the first antenna module malfunctions.

In an embodiment, the at least one memory and computer program code configured to, with the at least one processor, cause the apparatus to change boundaries of the service area of the access node by switching control of at least one of the first antenna module and the second antenna module from the access node to another access node, or by switching control of a further antenna module from said another access node to the access node.

According to an aspect, there is provided an apparatus comprising the at least one memory and computer program code configured to, with the at least one processor, cause the apparatus to: receive, at a first time interval, a signal from a first antenna module of an access node and a second antenna module of said access node, wherein the first antenna unit and the second antenna unit respectively provide an overlapping coverage area inside a service area of the access node, and wherein each of the first antenna module and the second antenna module provides respective coverages in the service area within the overlapping coverage area, said respective coverages being independent from one another; and receive, at a second time interval, a signal from only one of the first antenna unit and the second antenna unit that respectively provide non-overlapping coverage areas with respect to each other.

In an embodiment, the at least one memory and computer program code configured to, with the at least one processor, cause the apparatus to measure a signal received from at least one of the first antenna module and the second antenna module during at least one of the first time interval and the second time interval and to report corresponding measurement data to the access node.

According to an aspect, there is provided a method comprising: causing, at a first time interval, a first antenna module and a second antenna module to respectively provide overlapping coverage areas inside a service area of an access node of a cellular communication system, wherein the first antenna module and the second antenna module are antenna modules of the access node and each of the first antenna module and the second antenna module provides respective coverages in the service area within the overlapping coverage area, said respective coverages being independent of one another; and causing, at a second time interval, the first antenna module and the second antenna module to respectively provide non-overlapping coverage areas.

In an embodiment, the first antenna module is located at a different location within the service area than the second antenna module.

In an embodiment, the method comprises causing, at the second time interval, the first antenna module to establish a first cell and the second antenna module to establish a second cell.

In an embodiment, the method comprises causing, at the first time interval, the first antenna module to establish a first cell and the second antenna module to establish a second cell.

In an embodiment, each of the first antenna module and the second antenna module is configured to serve multiple terminal devices within its respective coverage area.

In an embodiment, the first antenna module and the second antenna module are controlled on the basis measurement data received from at least one terminal device in the cell and/or at least one antenna module.

In an embodiment, the first antenna module is configured to cover substantially the whole service area, and the second antenna module is configured to direct a radio beam to the service area during the first time interval and to direct the radio beam away from the service area during the second time interval.

In an embodiment, said causing at the first time interval is performed upon detecting at least one terminal device requesting for a connection specifying a reliability requirement above a determined threshold, and to perform said causing at the second time interval upon detecting termination of the connection.

In an embodiment, the method comprises selecting a multiple-input-multiple-output, MIMO, configuration for each of the first antenna module and the second antenna module separately for the first time interval and for the second time interval amongst multiple MIMO configurations supported by said each of the first antenna module and a second antenna module, wherein a MIMO configuration is defined in terms of a number of transmitting antennas and receiving antennas.

In an embodiment, the second antenna module is configured to provide connectivity within the overlapping coverage area during the first time interval in case the first antenna module malfunctions.

In an embodiment, boundaries of the service area of the access node are changed by switching control of at least one of the first antenna module and the second antenna module from the access node to another access node, or by switching control of a further antenna module from said another access node to the access node.

According to an aspect, a method comprises: receiving, at a first time interval, a signal from a first antenna module of an access node and a second antenna module of said access node, wherein the first antenna unit and the second antenna unit respectively provide an overlapping coverage area inside a service area of the access node, and wherein each of the first antenna module and the second antenna module provides respective coverages in the service area within the overlapping coverage area, said respective coverages being independent from one another; and receiving, at a second time interval, a signal from only one of the first antenna unit and the second antenna unit that respectively provide non-overlapping coverage areas with respect to each other.

In an embodiment, the method further comprises measuring a signal received from at least one of the first antenna module and the second antenna module during at least one of the first time interval and the second time interval and to report corresponding measurement data to the access node.

In an embodiment, the method is performed by a terminal device served by the access node.

According to an aspect, there is provided a computer program product embodied on a computer-readable medium and comprising a computer program code readable by a computer, wherein the computer program code configures the computer to carry out a computer process comprising the steps of any one of the above-described methods or embodiments thereof.

In an embodiment, the computer-readable medium is non-transitory.

LIST OF DRAWINGS

Embodiments are described below, by way of example only, with reference to the accompanying drawings, in which FIG. 1 illustrates a wireless communication scenario to which some embodiments of the disclosure may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
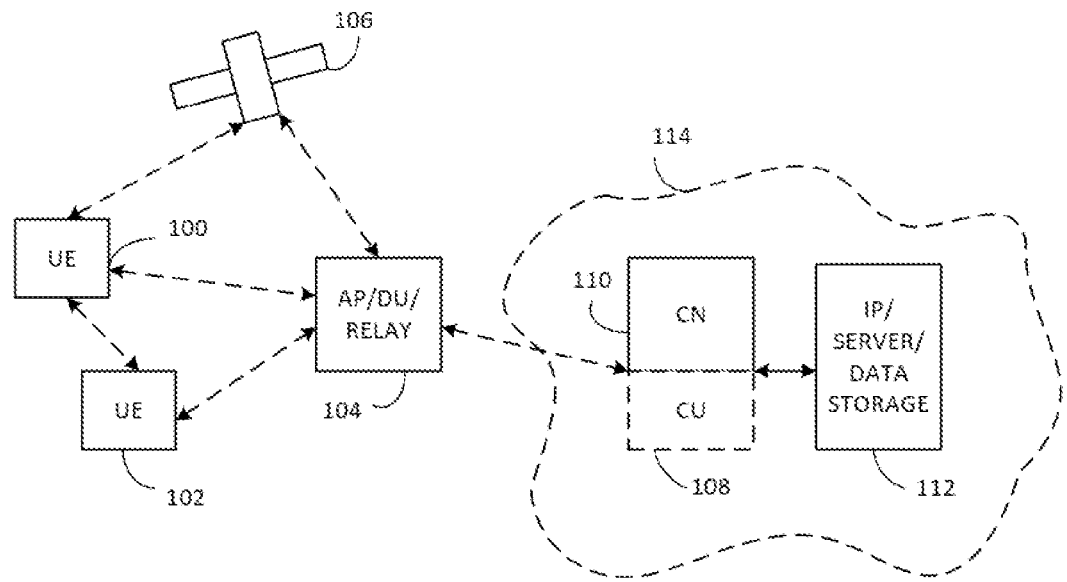

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bidirectional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
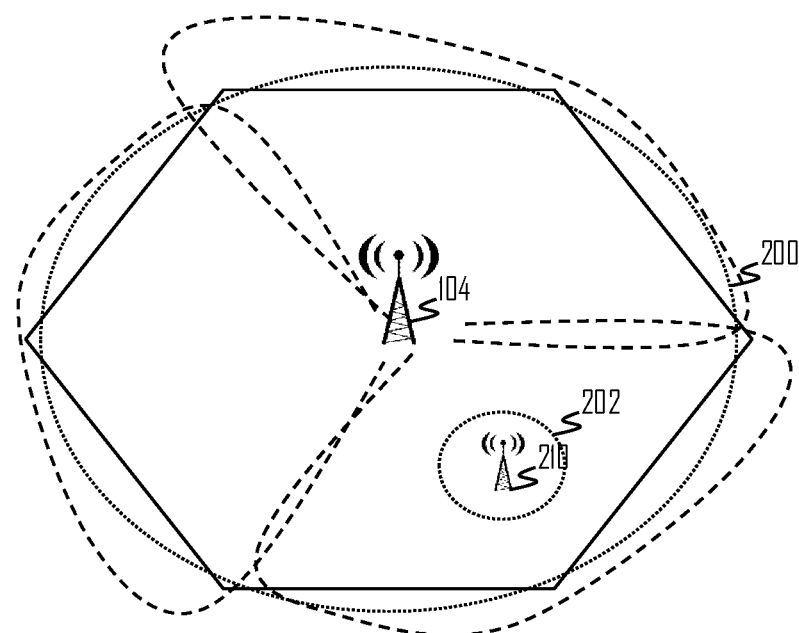
FIG. 2 illustrates an exemplary antenna module deployment.

FIG. 2 illustrates a scenario where an access node 104 is configured to provide radio coverage to terminal devices within its service area 200. The access node 104 may be configured to cover the service area with one omni-directional radio beam or with multiple spatially directive radio beams directed to different directions, e.g. to form the three sectors within the service area 200. The sectors may be separated vertically in the lateral direction, as illustrated in FIG. 2, and/or in a horizontal direction. Each sector may form a distinct cell, or different sectors of the same cell, depending on the implementation. The sectors may be logically separated by different identifiers, e.g. cell or sector identifiers broadcast by the access node 104, or the sectors may share the same identifier. The sectors are typically static while the access node may be capable of directing radio beams within each sector to provide a multiple-input-multiple-output (MIMO) connectivity to individual terminal devices within each sector. As described in Background, a secondary cell 202 or a femto cell may be provided by another access node within the service area 200, and the secondary cell typically also has a fixed coverage area. While coverage areas of the different radio beams providing the different sectors/cells may overlap, they are typically aimed to provide overlapping only sufficient for handover purposes in order to minimize interference between the sectors/cells. The cells having highly overlapping coverage areas, e.g. 200 and 202, are typically arranged to different frequency bands to minimize the interference.

In such a static solution, typically a single antenna arrangement such as an antenna module typically manages single-handedly one sector/cell or a part of the sector/cell. If such an antenna module happens to malfunction or break, there is typically an outage for at least a certain duration in the area covered by the antenna module. Such outage may be only an inconvenience for a consumer but may cause significant damage in critical applications such as emergency services or autonomous transportation relying on connectivity. On the other hand, such solutions are not very flexible to varying demands in the connectivity at variable areas of the service area 200.

Figure 3:
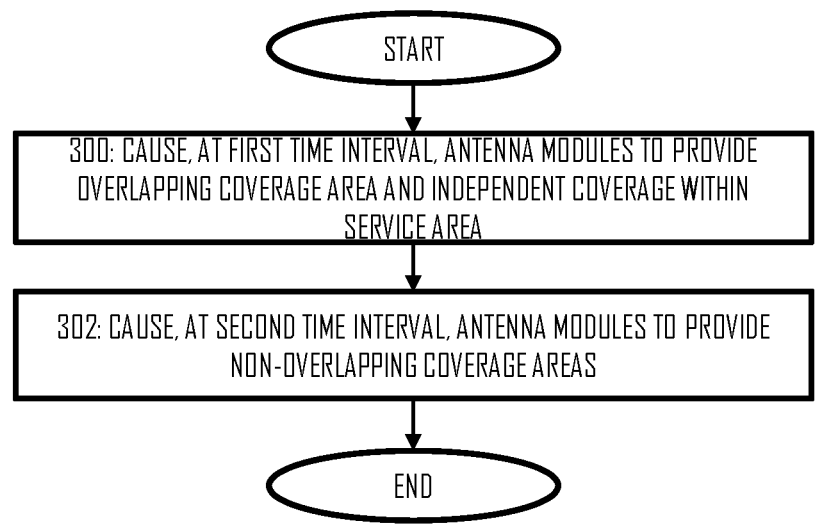
FIGS. 3 and 4 illustrate embodiments of processes for employing dynamic alignment of multiple antenna modules.
Figure 4:
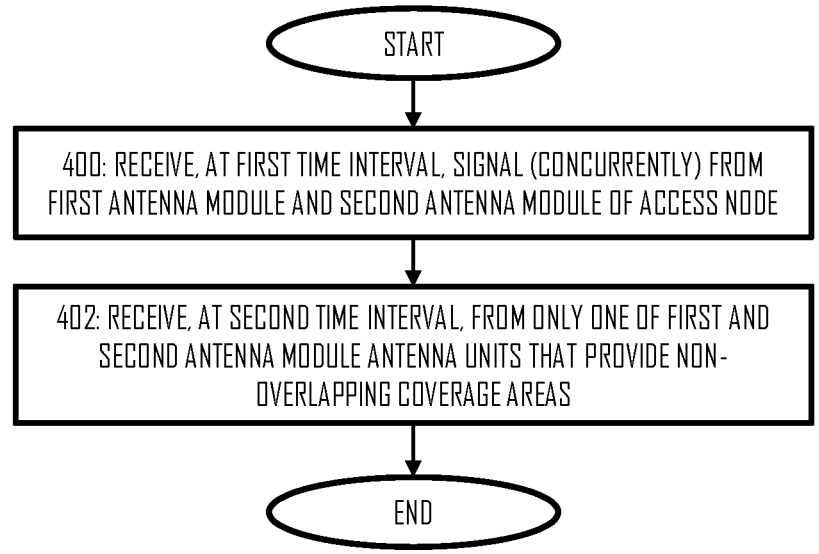

FIGS. 3 and 4 illustrate some embodiments for dynamic adaptation of antenna modules to provide various coverage areas within the service area of the access node 104. FIG. 3 illustrates a process from a perspective of a control entity controlling radio signal directivity of the antenna modules, and FIG. 4 illustrates a process from the perspective of a terminal device within the service area. Referring to FIG. 3, the process comprises: causing (block 300), at a first time interval, a first antenna module and a second antenna module to provide overlapping coverage areas inside a service area of an access node of a cellular communication system, wherein the first antenna module and the second antenna module are antenna modules of the access node and each of the first antenna module and the second antenna module provides independent coverage in the service area within the overlapping coverage area; and causing (302), at a second time interval, the first antenna module and the second antenna module to provide non-overlapping coverage areas.

Referring to FIG. 4, the process comprises at the terminal device: receiving (block 400), at a first time interval, a signal from a first antenna module of an access node and a second antenna module of said access node, wherein the first antenna unit and the second antenna unit provide an overlapping coverage area inside a service area of the access node, and wherein each of the first antenna module and the second antenna module provides independent coverage in the service area within the overlapping coverage area; and receiving (block 402), at a second time interval, a signal from only one of the first antenna unit and the second antenna unit that provide non-overlapping coverage areas with respect to each other.

The second time interval is different from the first time interval in both processes. Accordingly, the antenna modules of the access nodes may be configured to provide varying coverage areas within the service area of the access node, thus enabling flexibility to the provision of wireless services within the service area. The independent coverage provided by each antenna module during the first time interval may be understood as providing reliability for a case where one of the antenna modules malfunctions. For example, the second antenna module ensures connectivity within the overlapping coverage area during the first time interval in a case where the first antenna module malfunctions. In the second time interval, the antenna modules cover different coverage areas, thus providing reduced reliability with respect to one another but together covering a wider coverage area.

An antenna module may refer to a stand-alone antenna module that has an independent control from a control entity of the access node. A modern antenna module of an access node is called an active antenna system (AAS) that includes active radio frequency components. A distributed AAS contains multiple such antenna modules that may be controlled independently. Each antenna module may be capable of MIMO communications, providing multiple transmitting and multiple receiving antennas, e.g. 2-by-2, MIMO, 4-by-4 MIMO, 8-by-8 MIMO, etc. The antenna modules may be provided in different casings with different input/output connectors.

The control entity may carry out the process of FIG. 3, as described above, and dynamically control multiple antenna modules of the access nodes to provide varying coverage areas within the service area of the access node. Accordingly, the control entity may select, within the service area, one or more areas where increased redundancy and increased reliability is needed (overlapping coverage areas) and other areas where coverage of only one antenna module is sufficient (non-overlapping coverage areas). The control entity may control the coverage area of each antenna module and, further, control the MIMO configuration separately for each antenna module, depending on the need in respective parts of the service area.

In the distributed AAS case, the first antenna module is located at a different location within the service area than the second antenna module. Accordingly, independent directivity control may be computed for each antenna module, because of their different locations. The antenna modules connected to the same base station site and, thus, be separated by only a few feet or meters. However, at least some of the antenna modules controlled by the control entity may be more distant, e.g. even hundreds of feet/meters separated from other antenna modules, as illustrated in various embodiments next.

A combined coverage area of the antenna modules of the access node 104 may substantially cover the service area of the access node 104, even the whole service area, by providing one or multiple cells and/or sectors within the service area. Temporary coverage gaps within the service area may also be allowed by using the principles of the described embodiments, e.g. in areas with no terminal devices. Thus, interference towards other systems may be reduced. How the service area is covered by the multiple antenna modules or multiple access nodes, may be dynamically adapted according to observed conditions in the service area, e.g. types of radio links, terminal devices, mobility.

In an embodiment, each antenna module is configured to serve multiple terminal devices within its respective coverage area. Accordingly, the coverage areas distinguish from a case where multiple MIMO beams are directed towards a single terminal device.

Figure 5A:
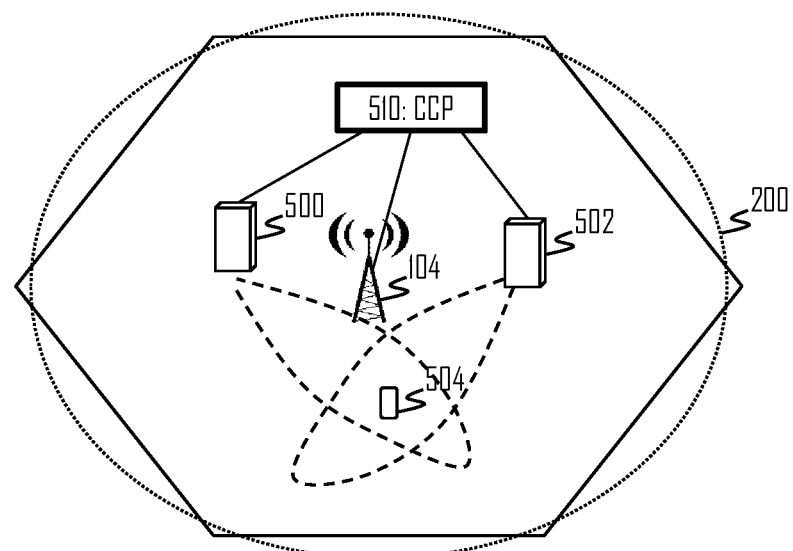
FIGS. 5A to 9 illustrate various deployment scenarios for the antenna modules according to various embodiments of the disclosure.
Figure 5B:
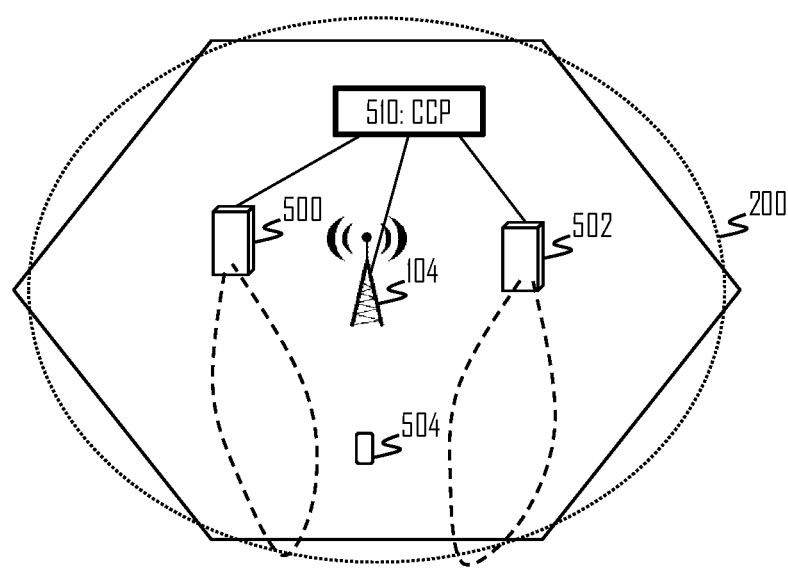

FIGS. 5A and 5B illustrate an embodiment of the coverage areas of different antenna modules 500, 502 of the access node during the first time interval (5A) and the second time interval (5B). The control entity 510 mentioned above may control the coverage areas of the antenna modules 500, 502. The control entity 510 may be called a consolidation and control point (CCP), for example. In addition to the antenna modules 500 and 502 separated from the base station site of the access node 104, one or more antenna modules may be provided at the base station site, e.g. to provide omni-directional coverage over substantially the whole service area 200 or to provide one or more legacy antenna modules fixed to provide a static coverage area. As an alternative to the omni-directional coverage, directivity may be employed when needed to cover the service area.

Referring to FIG. 5A, the CCP may control both antenna modules 500 and 502 to direct coverage towards an area where a terminal device 504 is located, thus providing improved and overlapping coverage to the location and area of the terminal device 504. The coverage areas of the antenna modules 500, 502 are illustrated by dashed lining associated with respective antenna modules in FIGS. 5A and 5B. Additionally, the antenna modules at the base station site may be controlled to provide further coverage through the omni-directional coverage that further overlaps with the coverage areas of the antenna modules 500, 502. In other words, at least three antenna modules may be directed to cover the area where the terminal device 504 is located, thus providing for very high reliability to a communication connection of the terminal device 504.

At the second time interval, the CCP controls the antenna modules 500, 502 to provide non-overlapping coverage areas. During the second time interval, neither antenna module 500, 502 may be directed towards the terminal device 504, and the terminal device may be served by the omni-directional radio beam(s) provided from the base station site of the access node 104. A use case where the scenario of FIGS. 5A and 5B may be utilized is, for example, such that the terminal device establishes a connection requiring reliable connectivity, e.g. an ultra-reliable low-latency (URLLC) connection specified in connection with 5G specifications, for example. Upon establishing such a connection, the CCP 510 may establish the coverage areas of FIG. 5A for the duration of the connection. When the connection ends (the first time interval expires), the CCP may switch to the coverage areas of Figure 5B, for example. Similar approach may be applied to any connection specifying a reliability requirement above a determined threshold. The reliability requirement may be specified in terms of latency, packet loss rate, outage probability, etc.

In an embodiment, the service area of the access node may be subject to changes. As described above, gaps in the coverage area may be allowed in areas with no terminal devices. Accordingly, observed traffic conditions and mobility of the terminal devices may be used to adaptively change the dimensions of the service area. The service area may be changed also by transferring control of a certain antenna module from one access node to another access node. Accordingly, the other access node may assume responsibility of a part of the service area by assuming the control of the antenna module. In that scenario, quality conditions may drive a fixed change of the service area. For example, if an antenna module exhibits poor link quality within the service area, it may be transferred to serve another service area. Employing a new antenna module in the service area may also cause changes to the service area, e.g. increase the service area. In a similar manner, removal of an antenna module may decrease the service area. Changing a coverage area of one or more of the antenna modules of the access node may also be used to change the dimensions of the service area.

In an embodiment, the antenna modules 500, 502 are each controlled, by the CCP for example, to apply a MIMO configuration for the coverage area of the respective antenna modules 500, 502. Each antenna module 500, 502 may be separately controlled to apply a MIMO configuration for the first time interval and for the second time interval amongst multiple MIMO configurations supported by each antenna module 500, 502.

Figure 6:
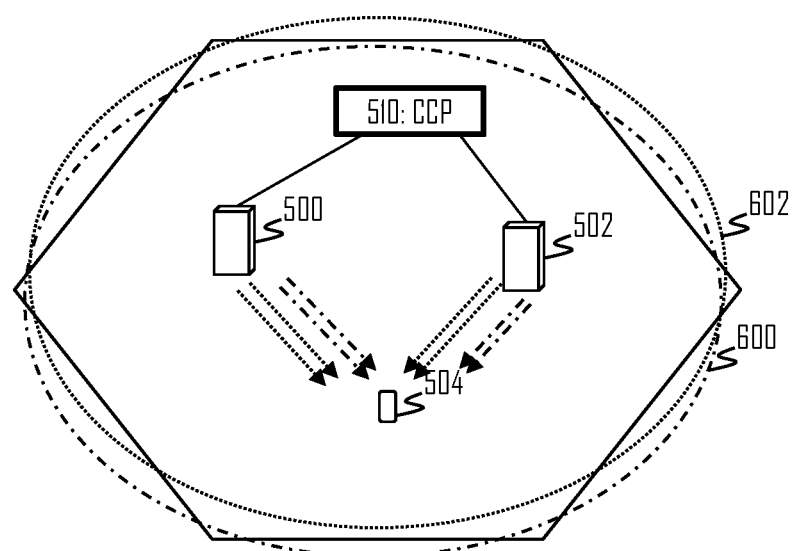

In an embodiment, the antenna module 500 is configured to establish a first cell and the antenna module 502 is configured to establish a second cell during the first time interval, and the first and second cell may have the overlapping coverage areas. Majority of the coverage areas of the cells may be overlapping. In a further embodiment, both antenna modules 500, 502 are configured to establish the first cell and the second cell that have fully, mainly, or partially overlapping coverage areas. FIG. 6 illustrates an embodiment where substantially the whole service area is covered by each of the antenna modules 500, 502 during the first time interval, and both antenna modules 500, 502 establish the first cell 600 and the second cell 602 within the service area. The cells 600, 602 may both cover substantially the whole service area. The cell 600 may be arranged on one frequency band, and the cell 600 may be arranged on another, different and non-overlapping frequency band. The terminal device 504 now has the capability of connecting to either one of the cells 600, 602 and via either antenna module 500, 502 or both of them. As a consequence, the terminal device 504 is provided with at least four channels through which to gain access to the radio access network through the access node: antenna module 500 and cell 600; antenna module 500 and cell 602; antenna module 502 and cell 600; and antenna module 502 and cell 602.

Figure 7:
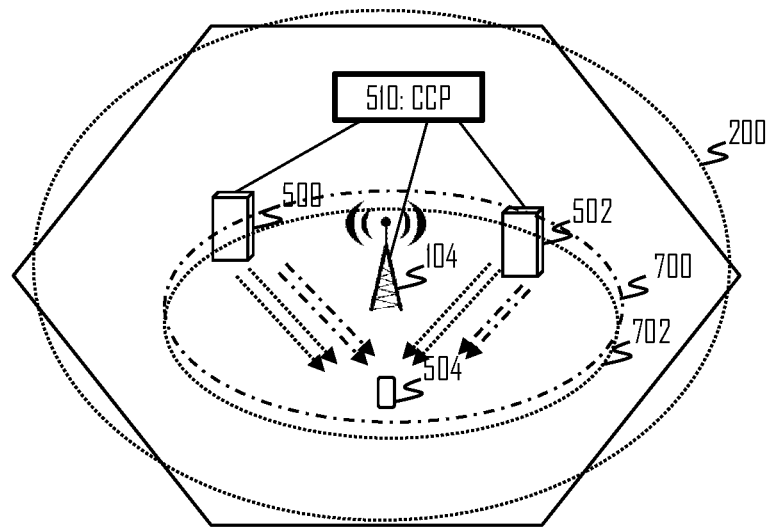

FIG. 7 illustrates yet another embodiment where the antenna modules 500, 502 are arranged to provide the overlapping coverage areas during the first time interval. This scenario differs from that of FIG. 6 in that the cells 700, 702 established by the antenna modules 500, 502 cover the service area only partially. The cells 700, 702 are in this case established to cover an area where the terminal device 504 resides. Additionally, the antenna module at the base station site may form the omni-directional beam covering substantially the service area 200, thus providing further options for connecting the terminal device 504 to the radio access network.

Figure 8:
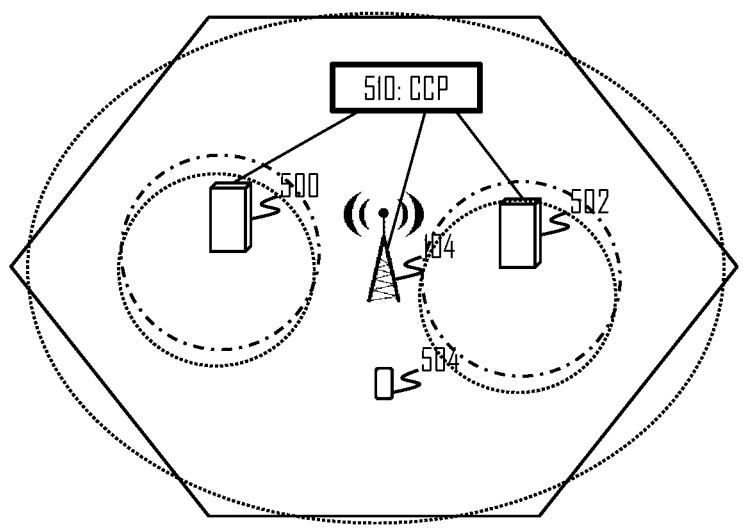

In an embodiment, the antenna module 500 is configured to establish a first cell and the antenna module 502 is configured to establish a second cell at the second time interval. FIG. 8 illustrates such an embodiment. The embodiment of FIG. 8 differs from that of FIGS. 6 and 7 in that the coverage areas of the antenna modules are non-overlapping within the service area, as specified above for the second time interval. As described above with reference to FIGS. 6 and 7, each antenna module may provide two different cells, e.g. on different frequency bands, or they may provide a single cell. The cell provided by the antenna module 500 may be the same as that provided by the antenna module 502, or the antenna modules 500, 502 may provide different cells during the second time interval. The cells may further be different from the cell provided by the antenna module(s) at the base station site covering the whole service area.

In an embodiment, when the antenna modules are provided on the base station site, the antenna modules may be configured to realize the sectorized coverage area of FIG. 2 during the second time interval.

Figure 9:
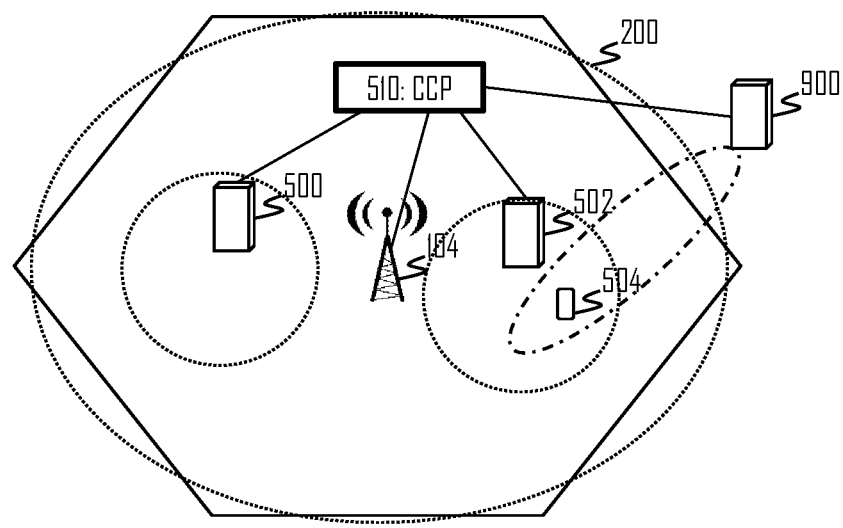

In an embodiment illustrated in FIG. 9, an antenna module 900 located outside the service area 200 is configured to direct a radio beam to the service area 200 during the first time interval and to direct the radio beam away from the service area 200 during the second time interval. FIG. 9 illustrates such operation during the first time interval where the CCP 510 controls the antenna module 900 to provide coverage area that overlaps with the coverage area of the antenna module 502. The CCP may detect, for example, critical radio connections within a certain part of the service area and determine that antenna modules provided within the service area are not sufficient for providing the required radio coverage to that area and, as a consequence, the CCP 510 controls the antenna module outside the service area to provide the required radio coverage. The antenna module 900 may be an antenna module of a neighbouring access node, for example. When the first time interval expires, the antenna module 900 may be directed to provide the coverage area outside the service area. By using principles of the disclosure, it is thus possible to arrange radio coverage within a service area of one access node by temporarily redirecting a radio beam of another access node to the service area. In a similar manner, any one of the antenna modules 500, 502 associated with the access node 104 may be controlled by the CCP 510 to direct a radio beam to provide a coverage area outside the service area 200 of the access node during the first time interval, second time interval, and/or another time interval. Accordingly, further flexibility can be achieved.

Let us next describe some embodiments for utilizing the overlapping coverage during the first time interval. When the same area is covered by multiple antenna modules and the area is known to comprise the terminal device 504 connected to the radio access network, the antenna modules may be used to transmit/receive the same signals to/from the terminal device 504. Accordingly, diversity gain can be achieved. In another embodiment, spatial multiplexing for the terminal device or terminal devices may be achieved by transmitting/receiving different (data) signals through different antenna modules. Such spatial multiplexing needs not be link-specific multiplexing but, rather, coverage-area-specific multiplexing in the sense that each antenna module may transmit/receive (data) signals to/from multiple terminal devices within its respective coverage area by using the same radiation pattern. Spatially distant antenna modules covering the same area during the first time interval inherently provide orthogonal radio paths that can be separated by the terminal device located in the area. As a consequence, two antenna modules each having two transmit antennas and two receive antennas may realize a 4-by-4 MIMO configuration within the area. In another embodiment, further link-specific directivity within the coverage area is used for an antenna module to provide multiple MIMO paths to an individual terminal device.

Figure 10:
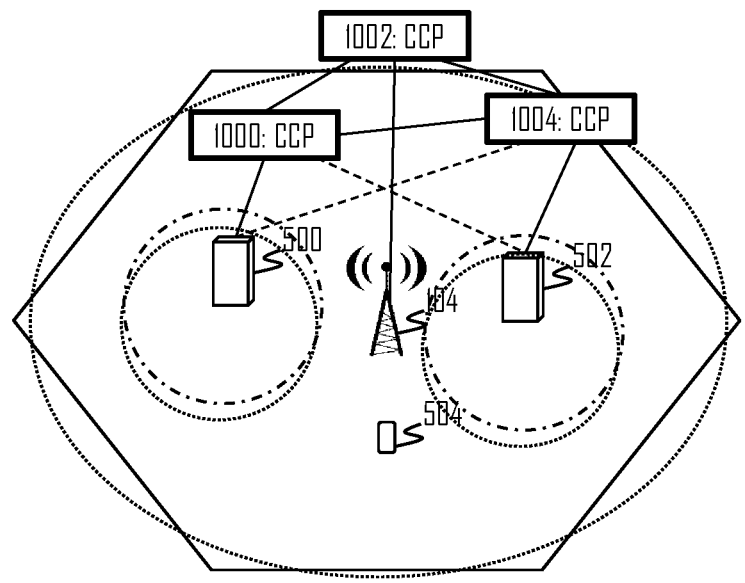
FIG. 10 illustrates an embodiment of consolidation and control points controlling antenna modules according to an embodiment of the disclosure.

In the embodiments described above, the CCP 510 is common to all antenna modules. FIG. 10 illustrates another embodiment where a dedicated CCP is provided for each antenna module. Such an embodiment is applicable to all embodiments described above. Provision of multiple CCPs 1000, 1002, 1004 to control antenna modules of the access node managing the service area 200 provides diversity on the CCP level. If one of the CCPs malfunctions, another CCP may replace the malfunctioning CCP. The CCPs may exchange any data or information needed in decision-making regarding the control of the antenna modules, as illustrated by lines between the CCPs in FIG. 10.

The CCP(s) 1000 to 1004 may be physically located in the respective antenna modules or physically separated from the respective antenna modules. The data or signals transmitted and received by the antenna modules to and from a terminal device may be coupled to a common baseband path. In other words, when the terminal device communicates with one or multiple antenna modules providing the same cell or even different cells, common baseband signal processing may be applied. The baseband signal processing may thus combine the different spatial branches through which the signal(s) are transmitted/received to/from the terminal device. The CCP(s) may be coupled to a baseband signal processing unit managing the baseband signal processing, thus acquiring the measurement data measured by the terminal device. The CCP(s) may then output control signals to the baseband signal processing to control, for example, the MIMO configuration(s). The CCP(s) may be coupled between the baseband signal processing and the antenna modules. In case the baseband signal processing is carried out by using cloud computing, the CCP(s) may be provided in a cloud computing system or coupled to the cloud computing system carrying out the baseband signal processing. In other words, the physical location of the CCP(s) may be very close to the antenna modules or even in the antenna modules or very remote from the antenna modules, e.g. in a server in a core network of the cellular communication system or even beyond.

The CCP(s) may also control the boundaries of the service area of the access node. Upon determining to switch a further antenna module from another access node to the control of the access node 104, the CCP(s) may also control switching of baseband processing from the other access node to the access node 104. In a similar manner, upon determining to switch an antenna module from the control of the access node 104 to the control of said another access node, the CCP(s) may also control switching of baseband processing from the access node 104 to said another access node.

Figure 11:
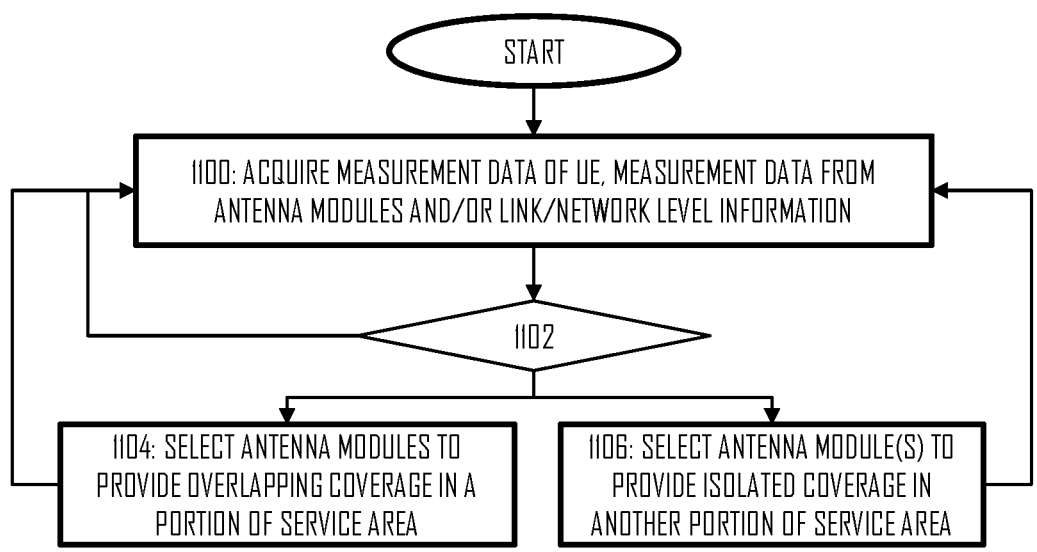
FIG. 11 illustrates a process for controlling antenna modules according to an embodiment of the disclosure.

The CCP(s) may control parameters of the respective antenna modules that are commonly known to affect the radiation pattern of the antenna modules: a transmission power, antenna tilt or alignment, and digital and/or analog beamforming parameters, for example. The control may be made on the basis of at least one of the following input parameters: measurement data from one or more terminal devices in the service area 200, measurement data from the antenna modules, network-level information acquired from the radio access network, location and/or mobility of the terminal device(s) in the service area, and information type of traffic and/or links in the service area. In some embodiments, the CCP(s) may additionally control the terminal devices in the service area. FIG. 11 illustrates an embodiment of a process for controlling the antenna modules. The process may be carried out in a single CCP 510 or distributed amongst the multiple CCPs 1000 to 1004.

Each CCP may receive measurement data from the antenna module the CCP controls and, additionally, directly from the other antenna modules of the service area, as illustrated in FIG. 10 by dashed lines connecting the antenna modules to the CCPs 1000, 1004.

Referring to FIG. 11, the process comprises acquiring input parameters in block 1100. In this Figure, the arrows are meant to only show possible steps that may be taken and do not necessarily mean that all steps are taken simultaneously. The input parameters may comprise at least some of the input parameters describe in the paragraph above. The measurement data measured by the one or more terminal devices (user equipment, UE) may comprise a signal strength or a signal quality measured from a signal received from one or more of the antenna modules. The terminal device may be capable of distinguishing the antenna module on the basis of a cell identifier, a sector identifier, or an antenna module identifier carried by the measured signal, or through other means known in the art. Further input parameters of the terminal device(s) may be acquired in block 1100, such as a location, height, capabilities and limitations, service requirement information, orientation, and speed of each terminal device. By using such information, the CCP is able to establish a picture of locations and mobility of the terminal devices, their traffic demand, capability of currently communicating with the different antenna modules, etc.

The measurement data received from the antenna modules may include sensor data acquired from one or more sensors coupled with each antenna module. Such measurement data may include a location, height, orientation, mechanical tilt angle of an antenna unit, and/or environmental information such as weather conditions, wind, cloud, and rain information that affect radio propagation. The antenna modules may measure a signal strength of a signal received from one or more other antenna modules of the access node 104 and/or a neighbouring access node. By using such measurement data, the CCP is capable of computing beam directivity parameters that configure the antenna module to direct radio beams to cover the desired area within the service area.

The network-level information acquired from the radio access network may include one or more of the following: transmission power levels of antenna modules, cell settings, traffic load in the access node 104 and in neighbor access nodes, a number of terminal devices in the service area 200, and neighbor cell or access node information. The network-level information enables the CCP to configure the cooperation between the multiple antenna modules such that the desired overlapping or non-overlapping coverage can be achieved. The network level information also enables adaptation of the service area to the status in the access node or in the radio access network in general. For example, if the traffic load in the access node is above a threshold, the CCP may allocate further antenna modules under the control of the access node, thus providing more radio access capacity. If the baseband of the access node is determined to be overloaded, the CCP may switch one or more antenna modules under the control of a neighboring access node, thus reducing the service area and causing handover of one or more terminal devices from the access node to the neighboring access node, thus releasing baseband resources.

Upon acquiring the input parameters, or upon detecting a change in the input parameters in block 1100, the CCP may execute a decision regarding a change in the configuration of the antenna modules (block 1102). On the basis of the decision in block 1102, the CCP may executed one or both of the blocks 1104 and 1106 or, upon determining that no changes are needed, return to block 1100. In block 1104, the CCP changes the configuration such that multiple antenna modules are arranged to provide an overlapping coverage area within the service area. In block 1106, the CCP changes the configuration of one or more antenna modules to provide a coverage area within the service area that is non-overlapping with coverage areas of the other antenna modules of the access node 104.

Let us next describe a few use cases for the execution of the process of FIG. 11. The CCP may detect that a terminal device has established a connection that requires high reliability, e.g. the URLLC. As a consequence, the CCP may execute block 1104 and direct multiple antenna modules to provide coverage to the location of the terminal device and, as a consequence, the coverage areas of the multiple antenna modules will overlap in that portion of the service area. As the terminal device is detected to be moving, as indicated by the input parameters related to the terminal device acquired in block 1100, the CCP controls the directivity of the antenna modules to follow the mobility of the terminal device. If the terminal device moves to an area where one or more of the antenna modules are incapable of providing a coverage area, the CCP may select a new antenna module to direct its coverage area to the coverage area such that multiple antenna modules cover the location of the terminal device for the duration of the connection within the service area. One or more of the antenna modules may provide multiple cells within the coverage area to provide further capability of serving the terminal device. When the terminal device terminates the connection, the CCP may control one or more of the antenna modules to provide non-overlapping coverage areas. The CCP may detect the high-reliability connections through traffic monitoring or by receiving such information from the access node, from the terminal devices, or from an application server in a core network or beyond the core network. With respect to the traffic monitoring, a Layer 3 Data Collector (L3DC) may be employed.

The classification of the high-reliability connection may employ connection classification of the radio access network, i.e. on a lower protocol layers. An example of the high-reliability connection would be the URLLC while an enhanced mobile broadband connection is an example of a connection that does not require the high reliability, according to the 5G specifications. From another perspective, the classification of the high-reliability connection may employ connection classification on an application layer. For example, a certain application executed in a terminal device and using a radio connection may require high reliability while another application using the radio connection does not. Such information may be delivered to the CCP from the terminal device, for example, so that the CCP may carry out the process of FIG. 11. The information may equally be acquired through the traffic monitoring, e.g. the L3DC, or from the application server described above.

The CCP may detect, on the basis of measurement data received from the antenna modules, that a mechanical tilt of an antenna module has changed and that causes a gap in the coverage area of the access node. As a consequence, the access node is currently not capable of providing connectivity in the whole service area. As a consequence, the CCP may realign a transmission pattern of the antenna module or direct one or more of the other antenna modules to cover the gap. In a similar manner, the CCP is capable of compensating effects of a changed orientation of an antenna module, a malfunctioning antenna module, effects of the environmental conditions on the coverage, etc. As a further example, if the CCP detects on the basis of the network level information and/or information received from the terminal devices that a certain area of the service area is prone to low connection quality at a determined time of the day, the CCP may proactively align multiple antenna modules to cover such an area for such a time interval. During other times, the area may be covered by a single antenna module.

The CCP may thus use a machine learning algorithm to detect patterns in the coverage and requirements within the service area and either find a solution to react any situation or even proactively control the antenna modules to avoid any gaps or connectivity issues within the service area.

Figure 12:
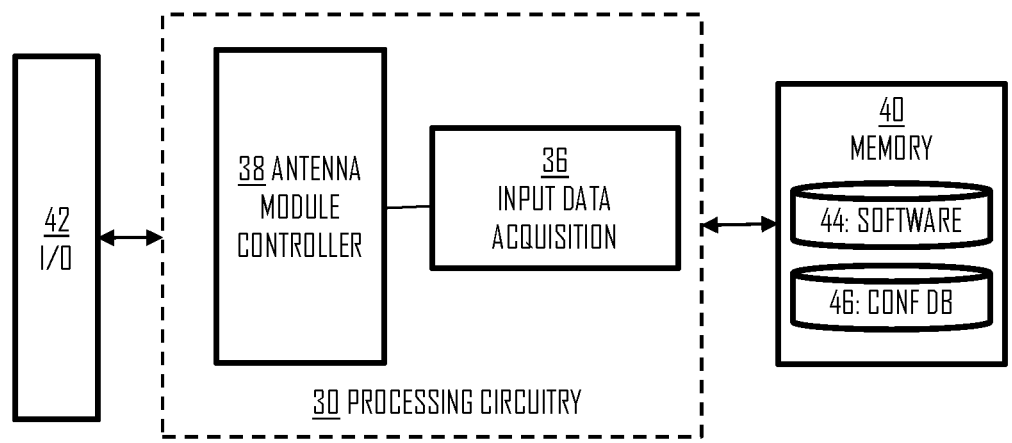
FIGS. 12 and 13 illustrate block diagrams of structures of apparatuses according to some embodiments of the disclosure.

FIG. 12 illustrates an embodiment of a structure of the above-mentioned functionalities of an apparatus executing the functions of the CCP in the process of FIG. 2 or any one of the embodiment described above for the CCP. The CCP may be comprised in the antenna module, in the access node, for example. The apparatus may comprise a circuitry, e.g. a chip, a chipset, a processor, a micro controller, or a combination of such circuitries in the CCP. The apparatus may be an electronic device comprising electronic circuitries for realizing some embodiments of the CCP.

Referring to FIG. 12, the apparatus may comprise a communication interface 42 or a communication circuitry configured to provide the apparatus with capability for bidirectional communication with one or more antenna modules. Depending on the location of the apparatus with respect to the antenna modules, the communication interface 42 may support any communication protocol suitable for fiber optic cable channels or a communication protocol suitable for copper cable channels.

The apparatus may further comprise a memory 20 storing one or more computer program products 24 configuring the operation of at least one processor 30 of the apparatus. The memory 20 may further store a configuration database 26 storing, for example, the input parameters described above in connection with FIG. 11.

The apparatus may further comprise the at least one processor or processing circuitry 30 configured to carry out the process of FIG. 3 or any one of its embodiments. The processor may comprise an input data acquisition circuitry 36 configured to gather the input parameters described above. The input parameters may comprise static parameters and parameters that are updated intermittently, e.g. the measurement data. The processor may further comprise an antenna module controller configured to executed blocks 1102 to 1106 of FIG. 11.

Figure 13:
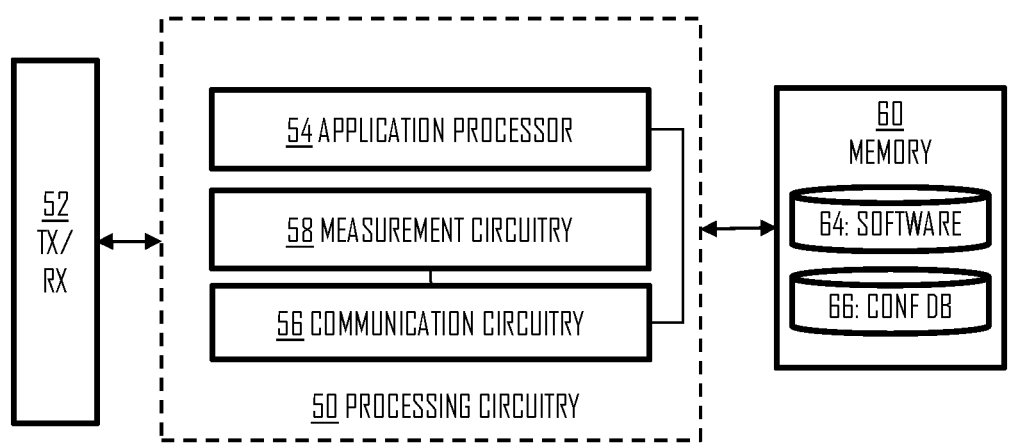

FIG. 13 illustrates an embodiment of a structure of the above-mentioned functionalities of an apparatus executing the functions of the terminal device in the process of FIG. 4 or any one of the embodiment described above for the terminal device. The terminal device may be a cellular phone, a sensor device, a tablet computer, a car or a vehicle, or any other device to which a cellular modem is installed. The apparatus may comprise a circuitry, e.g. a chip, a chipset, a processor, a micro controller, or a combination of such circuitries in any one of these terminal devices. The apparatus may be an electronic device comprising electronic circuitries for realizing some embodiments of the terminal device.

Referring to FIG. 13, the apparatus may comprise a communication interface 52 or a communication circuitry configured to provide the apparatus with capability for bidirectional radio communication with one or more antenna modules. The communication interface 52 may any one of the cellular radio communication protocols described above. The communication interface may comprise a radio modem or a part of a radio modem and, further, radio frequency components designed for the supported cellular radio communication protocol.

The apparatus may further comprise a memory 60 for storing one or more computer program products 64 configuring the operation of at least one processor 50 of the apparatus. The memory 60 may further store a configuration database 66 storing, for example, current radio link parameters of a connection established with the radio access network.

The apparatus may further comprise the at least one processor or processing circuitry 50 configured to carry out the process of FIG. 4 or any one of its embodiments. The processor may comprise a communication circuitry 56 comprising at least a digital baseband circuitry of the radio modem. The communication circuitry may carry out or control transmission and reception of cellular communication signals with one or more access nodes with which the terminal device communicates. The processor 50 may further comprise a measurement circuitry 58 configured to carry out the measurements described above with respect to the terminal device and output the measurement data to the communication circuitry to be transmitted to the CCP over the radio interface. The measurement circuitry 58 may measure, for example, the location of the terminal device and/or signal strength of radio signal(s) received from the antenna module(s). The processing circuitry 50 may further comprise an application processor 54 configured to execute one or more computer program applications related to a primary purpose of the apparatus, wherein the primary purpose requires the cellular connectivity. For example, if the apparatus is the cellular phone, the application processor 54 may execute applications such as an internet browser, a voice communication application, or a messaging application. If the apparatus is a sensor device, the application processor 54 may execute a measurement application configured to analyse or process measurement data acquired from one or more sensors of the apparatus.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the disclosure.

The processes or methods described in FIGS. 3 to 11 may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising at least one controller for controlling radio signal directivity of a first antenna module and a second antenna module of a single service area of a cellular communication system, wherein the at least one controller is configured to:
   acquire input parameters comprising a location of a terminal device and capability of the terminal device for communicating with the first and second antenna modules of the single service area;
   upon the terminal device establishing a connection, receive, from the terminal device, a specified reliability requirement relative to a determined threshold, wherein the specified reliability requirement corresponds to at least one of latency, packet loss rate, and outage probability;
   cause, at a first time interval, the first antenna module and the second antenna module to respectively provide overlapping coverage areas where the terminal device is located to satisfy the specified reliability requirement inside the single service area of an access node of the cellular communication system, wherein the first antenna module and the second antenna module are antenna modules of the access node and each of the first antenna module and the second antenna module provides respective coverage in the single service area within the overlapping coverage area, said respective coverages being independent of one another and not different sectors generated by a single sectorized antenna; and
   upon the terminal device terminating the connection, cause, at a second time interval, the first antenna module and the second antenna module to respectively provide non-overlapping coverage areas.

2. The apparatus of claim 1, wherein the first antenna module is located at a different location within the single service area than the second antenna module.

3. The apparatus of claim 1, wherein the at least one controller is configured to cause, at the second time interval, the first antenna module to establish a first cell and the second antenna module to establish a second cell.

4. The apparatus of claim 1, wherein the at least one controller is configured to cause, at the first time interval, the first antenna module to establish a first cell and the second antenna module to establish a second cell.

5. The apparatus of claim 1, wherein the at least one controller is configured to cause each of the first antenna module and the second antenna module to serve multiple terminal devices within its respective coverage area.

6. The apparatus of claim 1, wherein the at least one controller is configured to control the first and second antenna modules based on measurement data received from the at least one terminal device comprising at least one of a signal strength and a signal quality measured from a signal received by the at least one terminal device from one or more of the first and second antenna modules.

7. The apparatus of claim 1, wherein the at least one controller is configured to cause the first antenna module to cover substantially the whole single service area, and wherein the at least one controller is configured to cause the second antenna module to direct a radio beam to the single service area during the first time interval and to direct the radio beam away from the single service area during the second time interval.

8. The apparatus of claim 1, wherein the at least one controller is further configured to select a multiple-input-multiple-output, MIMO, configuration for each of the first antenna module and the second antenna module separately for the first time interval and for the second time interval amongst multiple MIMO configurations supported by said each of the first antenna module and a second antenna module, wherein a MIMO configuration is defined in terms of a number of transmitting antennas and receiving antennas.

9. The apparatus of claim 1, wherein the at least one controller is configured to cause the second antenna module to provide connectivity within the overlapping coverage area during the first time interval in case the first antenna module malfunctions.

10. The apparatus of claim 1, wherein the at least one controller is configured to change boundaries of the single service area of the access node by switching control of at least one of the first antenna module and the second antenna module from the access node to another access node, or by switching control of a further antenna module from said another access node to the access node.

11. The apparatus of claim 1, wherein the at least one controller is further configured to measure a signal received from at least one of the first antenna module and the second antenna module during at least one of the first time interval and the second time interval and to report corresponding measurement data to the access node.

12. The apparatus of claim 1, wherein the at least one controller comprises:
at least one processor; and
at least one memory including computer program code, the at least one memory and computer program code configured to, with the at least one processor, cause the performance of the apparatus.

13. The apparatus of claim 1, wherein the at least one controller is configured to control directivity of at least one of the first antenna module and the second antenna module to follow movement of the terminal device.

14. An apparatus configured to:
establish a connection;
transmit a specified reliability requirement relative to a determined threshold, wherein the specified reliability requirement corresponds to at least one of latency, packet loss rate, and outage probability;
receive, at a first time interval after establishing the connection, a signal from a first antenna module of an access node of a cellular communication system and a second antenna module of said access node, wherein the first antenna module and the second antenna module respectively provide an overlapping coverage area where the terminal device is located to satisfy the specified reliability requirement inside a single service area of the access node, and wherein each of the first antenna module and the second antenna module provides respective coverage in the single service area within the overlapping coverage area, said respective coverages being independent from one another and not different sectors generated by a single sectorized antenna;
terminate the connection; and
receive, at a second time interval after terminating the connection, a signal from only one of the first antenna module and the second antenna module that respectively provide non-overlapping coverage areas with respect to each other.

15. The apparatus of claim 14, wherein the apparatus is a user device or a relay node.

16. The apparatus of claim 14, wherein the apparatus is configured to transmit measurement data to the access node comprising at least one of a signal strength and a signal quality measured from a signal received by the apparatus from one or more of the first and second antenna modules.

17. A method comprising at least one controller for a first antenna module and a second antenna module of a single service area of a cellular communication system:
acquiring input parameters comprising a location of a terminal device and capability of the terminal device for communicating with the first and second antenna modules of the single service area;
upon the terminal device establishing a connection, receiving from the terminal device, a specified reliability requirement relative to a determined threshold, wherein the specified reliability requirement corresponds to at least one of latency, packet loss rate, and outage probability;
causing, at a first time interval, the first antenna module and the second antenna module to respectively provide overlapping coverage areas where the terminal device is located to satisfy the specified reliability requirement inside the single service area of an access node of the cellular communication system, wherein the first antenna module and the second antenna module are antenna modules of the access node and each of the first antenna module and the second antenna module provides respective coverage in the single service area within the overlapping coverage area, said respective coverages being independent of one another and not different sectors generated by a single sectorized antenna; and
upon the terminal device terminating the connection, causing, at a second time interval, the first antenna module and the second antenna module to respectively provide non-overlapping coverage areas.

18. The method of claim 17, further comprising controlling directivity of at least one of the first antenna module and the second antenna module to follow movement of the terminal device.

19. A method comprising a terminal device:
establishing a connection;
transmitting a specified reliability requirement relative to a determined threshold, wherein the specified reliability requirement corresponds to at least one of latency, packet loss rate, and outage probability;

receiving, at a first time interval after establishing the connection, a signal from a first antenna module of an access node of a cellular communication system and a second antenna module of said access node, wherein the first antenna unit and the second antenna unit respectively provide an overlapping coverage area where the terminal device is located to satisfy the specified reliability requirement inside a single service area of the access node, and wherein each of the first antenna module and the second antenna module provides respective coverage in the single service area within the overlapping coverage area, said respective coverages being independent from one another and not different sectors generated by a single sectorized antenna;

terminating the connection; and receiving, at a second time interval after terminating the connection, a signal from only one of the first antenna unit and the second antenna unit that respectively provide non-overlapping coverage areas with respect to each other.

20. The method of claim 19, further comprising the terminal device transmitting measurement data comprising at least one of a signal strength and a signal quality measured from a signal received by the terminal device from one or more of the first and second antenna modules.

* * * * *